(12) United States Patent
Wu (10) Patent No.: US 9,632,325 B2
(45) Date of Patent: Apr. 25, 2017

(54) LIQUID CRYSTAL SLIT GRATING AND STEREOSCOPIC DISPLAY DEVICE

(71) Applicant: BOE Technology Group Co., Ltd., Beijing (CN)

(72) Inventor: Yanbing Wu, Beijing (CN)

(73) Assignee: BOE Technology Group Co., ltd., Beijing (CN)

( * ) Notice: Subject to any disclaimer, the term of this patent is extended or adjusted under 35 U.S.C. 154(b) by 0 days.

(21) Appl. No.: 14/060,875

(22) Filed: Oct. 23, 2013

(65) Prior Publication Data

US 2014/0125893 A1 May 8, 2014

(30) Foreign Application Priority Data

Nov. 8, 2012 (CN) .......................... 2012 1 0444476

(51) Int. Cl.
G02B 27/26 (2006.01)
G02B 27/22 (2006.01)
G02F 1/1339 (2006.01)

(52) U.S. Cl.
CPC ......... *G02B 27/26* (2013.01); *G02B 27/2214* (2013.01); *G02F 1/13394* (2013.01)

(58) Field of Classification Search
CPC .. G02B 27/2214; G02B 27/26; G02F 1/13394
See application file for complete search history.

(56) References Cited

U.S. PATENT DOCUMENTS

| 6,618,113 B1* | 9/2003 | Ulrich ............... G02F 1/133377 349/156 |
| 2003/0201960 A1* | 10/2003 | Fujieda .......................... 345/87 |
| 2005/0168816 A1* | 8/2005 | Fukaishi ............... G02B 27/26 359/465 |

(Continued)

FOREIGN PATENT DOCUMENTS

| CN | 1963606 A | 5/2007 |
| CN | 201037882 Y | 3/2008 |

(Continued)

OTHER PUBLICATIONS

Extended European search report issued for corresponding application 13190101.9 dated Jan. 21, 2014.

(Continued)

*Primary Examiner* — Dennis Y Kim
(74) *Attorney, Agent, or Firm* — Haug Partners LLP (57) ABSTRACT

The present invention discloses a liquid crystal slit grating and a stereoscopic display device, the liquid crystal slit grating includes a first grating substrate and a second grating substrate facing each other, and a plurality of photo spacers supporting between the first grating substrate and the second grating substrate; the stereoscopic display device includes a display panel and said liquid crystal slit grating which is parallel to each other. The liquid crystal slit grating of the present invention provides conditions for accurately controlling effects of the photo spacers on light transmittance or accurately controlling crosstalk caused by the photo spacers.

(Continued)

The stereoscopic display device of the present invention provides conditions for improving 3D effect of stereoscopic display device during three dimensionally displaying.

9 Claims, 4 Drawing Sheets

(56) References Cited

U.S. PATENT DOCUMENTS

| | | | |
|---|---|---|---|
| 2011/0236681 A1* | 9/2011 | Kim et al. | 428/343 |
| 2012/0044451 A1* | 2/2012 | Inoue | 349/155 |
| 2012/0057087 A1 | 3/2012 | Takagi et al. | |
| 2012/0236237 A1* | 9/2012 | Kanari et al. | 349/110 |
| 2012/0268671 A1* | 10/2012 | Inoue | G02B 27/2214 349/15 |
| 2013/0293802 A1* | 11/2013 | Chae | 349/58 |

FOREIGN PATENT DOCUMENTS

| | | |
|---|---|---|
| CN | 101424814 A | 5/2009 |
| CN | 202854459 U | 4/2013 |
| EP | 2 500 762 A | 9/2012 |
| JP | 2008-058433 A | 3/2008 |
| KR | 10-2007-0012653 A | 1/2007 |
| KR | 10-2008-0001174 A | 1/2008 |
| KR | 10-2008-0057883 A | 6/2008 |
| KR | 10-2012-0003042 A | 1/2012 |
| KR | 10-2012-0100504 A | 9/2012 |

OTHER PUBLICATIONS

First office action and search report from Chinese Patent Office for priority application 201210444476.5 dated Jan. 21, 2014.
Second office action from Chinese Patent Office for priority application 201210444476.5 dated Jun. 30, 2014.
Notice of Preliminary Rejection from Korean Patent Office for corresponding application 10-2013-0135537 dated Sep. 29, 2014 With English Translation.

* cited by examiner

Prior Art

FIG. 1

Prior Art

FIG. 2

Prior Art

LIQUID CRYSTAL SLIT GRATING AND STEREOSCOPIC DISPLAY DEVICE

FIELD OF THE INVENTION

The present invention relates to technical field of stereoscopic display, and particularly, to a liquid crystal slit grating and a stereoscopic display device.

BACKGROUND OF THE INVENTION

Figure 1:
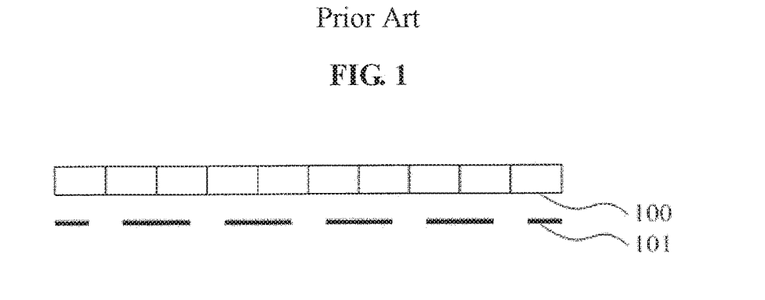
FIG. 1 is a schematic diagram of basic structure of a grating type autostereoscopic display device.

An autostereoscopic display device refers to a display device with which an image with stereoscopic effect can be observed through naked eyes without wearing glasses. A slit grating type autostereoscopic display device can alternately display pixels of a display panel by column as left parallax images and right parallax images, and a grating is provided in front of or behind the display panel in parallel. In a basic structure as shown in FIG. 1, gratings 101 are parallel provided in front of display panel 100. With the shielding effect of the gratings, the left eye and right eye of an observer see left parallax images and right parallax images displayed by pixels on a display panel, respectively, and thus the observer obtains a visual stereoscopic display image. The core component of a slit grating type autostereoscopic display device is grating. In prior art, lens grating and slit grating are the two main techniques. Wherein, slit grating can further be divided into black-and-white stripe slit grating and liquid crystal slit grating. Liquid crystal slit grating can be used not only for stereoscopic display, but also for switching between two-dimensional display and three-dimensional display.

Liquid crystal slit grating (i.e., a liquid crystal cell which can form slit grating) includes twisted nematic liquid crystal mode (abbreviated as TN mode) liquid crystal slit grating, advanced super dimension switch (abbreviated as ADSDS mode) liquid crystal slit grating, and the like. Wherein, TN mode liquid crystal slit grating is a liquid crystal slit grating whose liquid crystal molecular forms a nematic liquid crystal layer with twisted angle of 90 degree, and ADSDS mode liquid crystal slit grating is a liquid crystal slit grating of which all oriented liquid crystal molecular between and right above the slit electrodes in a liquid crystal cell can be rotated through multiple dimension electric field, and the multiple dimension electric filed consists of the electric field generated by the edges of the slit electrodes in the same plane and the electric field generated between a slit electrode layer and a plate electrode layer.

Figure 2:
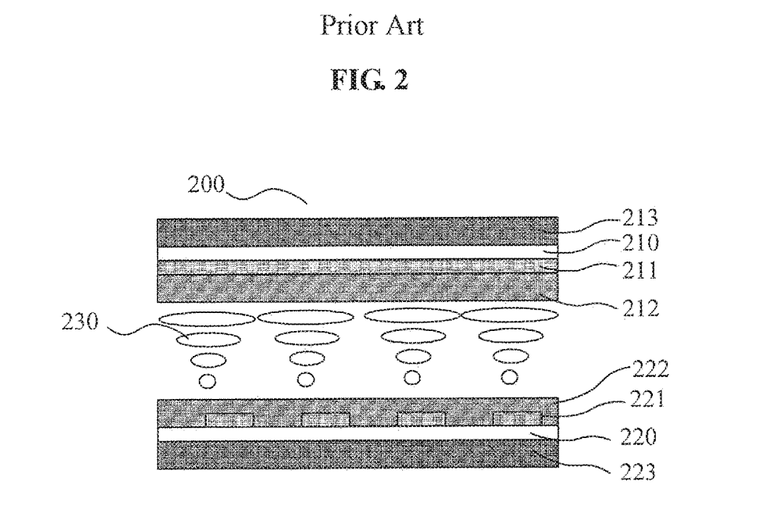
FIG. 2 is a schematic diagram of an existing TN mode liquid crystal slit grating.

As shown in FIG. 2, an existing TN mode liquid crystal slit grating 200 includes a first grating substrate and a second grating substrate. Nematic liquid crystal layer 230 with twisted angle of 90 degree is provided between the first grating substrate and the second grating substrate. The first grating substrate includes a first polarizer 213, a first substrate 210, a first electrode 211 covering the first substrate 210 and a first alignment layer 212 covering the first electrode 211. The second grating substrate includes a second polarizer 223, a second substrate 220, a second electrode 221 including a plurality of stripe electrodes parallel to each other and a second alignment layer 222 covering each stripe electrode and interval areas between the stripe electrodes.

In a case where the polarization directions of the first polarizer 213 and the second polarizer 223 are perpendicular to each other (i.e., the liquid crystal slit grating 200 is normally white mode), when there is no potential difference between the first electrode 211 and the second electrode 221, the nematic liquid crystal layer 230 provided between the first grating substrate and the second grating substrate twists the polarization direction of light by 90 degree, and thus light can pass through the first polarizer 213 and the second polarizer 223. In other words, when there is no potential difference between the first electrode 211 and the second electrode 221, the liquid crystal slit grating 200 wholly is transparent, and thus can be used for two-dimensional display. On the other hand, when an operating potential difference exists between the first electrode 211 and the second electrode 221, the potential difference cause the nematic liquid crystal layer 230 located between each stripe electrode of the second electrode 221 and the first electrode 211 not to twist the polarization direction of light by 90 degree, thus the liquid crystal slit grating 200 displays black stripes at the position of each stripe electrode, and transparent white stripes are formed between adjacent black stripes. A plurality of black stripes form opaque stripe area, and a plurality of white stripes form transparent stripe area. Consequently, the liquid crystal slit grating 200 becomes a slit grating with black stripes and white stripes at intervals, and can realize three-dimensional display working with a display panel.

In a case where the polarization directions of the first polarizer 213 and the second polarizer 223 are parallel to each other (i.e., the liquid crystal slit grating 200 is normally black mode), when there is no potential difference between the first electrode 211 and the second electrode 221, the nematic liquid crystal layer 230 provided between the first grating substrate and the second grating substrate twists the polarization direction of light by 90 degree, and thus the light cannot pass the second polarizer 223 after passing the first polarizer 213. In other words, when there is no potential difference between the first electrode 211 and the second electrode 221, the liquid crystal slit grating 200 wholly is opaque. On the other hand, when an operating potential difference exists between the first electrode 211 and the second electrode 221, the operating potential difference cause the nematic liquid crystal layer 230 located between each stripe electrode of the second electrode 221 and the first electrode 211 not to twist the polarization direction of light by 90 degree any longer, thus the liquid crystal slit grating 200 displays white stripes at the position of each stripe electrode, and opaque black stripes are formed between adjacent white stripes. A plurality of black stripes form opaque stripe area, and a plurality of white stripes form transparent stripe area. Consequently, the liquid crystal slit grating 200 becomes a slit grating with spaced black stripes and white stripes, and can realize three-dimensional display working with a display panel.

Figure 3:
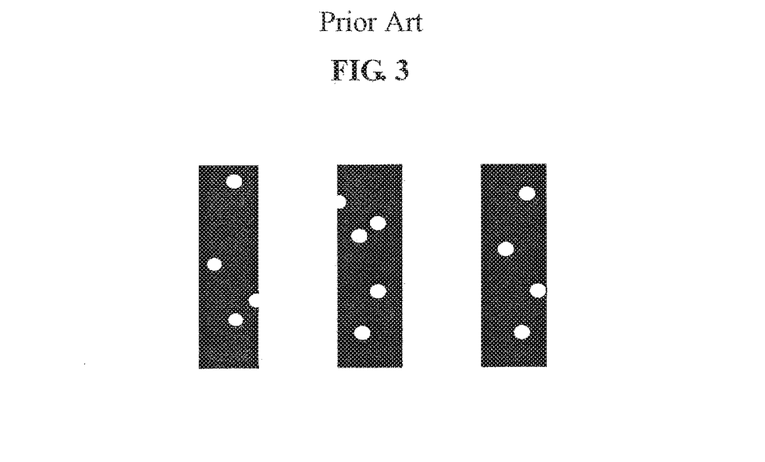
FIG. 3 is a schematic diagram illustrating that in a case where an existing TN mode liquid crystal slit grating is normally black mode, ball spacers in an opaque stripe area form white dots in the opaque stripe area.

In prior art, TN mode liquid crystal slit grating mostly uses ball spacers to support the first grating substrate and the second grating substrate. As ball spacers are disposed by way of spraying, a lot of ball spacers are sprayed in opaque stripe area and a lot of ball spacers are sprayed in transparent stripe area at the same time, and the location of a ball spacer cannot be accurately controlled. A ball spacer is isotropic and does not twist the polarization direction of light. For liquid crystal slit grating in normally white mode (i.e., the polarization directions of the first polarizer 213 and the second polarizer 223 are perpendicular to each other), the ball spacers located in the transparent stripe area may form black dots in the transparent stripe area, and thus affecting light transmittance. Therefore, for liquid crystal slit grating in normally white mode, the formation manner of the ball spacers will cause that the location of each ball spacer cannot be accurately controlled, and further the effect of the ball spacers on light transmittance cannot be accurately controlled. On the other hand, for liquid crystal slit grating in normally black mode (i.e., the polarization directions of the first polarizer 213 and the second polarizer 223 are parallel to each other), the ball spacers located in the opaque stripe area may form white dots in the opaque stripe area, and thus being displayed as light leak and causing crosstalk, as shown in FIG. 3. Therefore, for liquid crystal slit grating in normally black mode, the formation manner of the ball spacers will cause that the locations of ball spacers cannot be accurately controlled, and further crosstalk caused by the ball spacers cannot be accurately controlled.

The above problems exist not only in a TN mode liquid crystal slit grating, but also in a liquid crystal slit grating of other mode, such as a ADSDS mode liquid crystal slit grating.

SUMMARY OF THE INVENTION

The present invention provides a liquid crystal slit grating and a stereoscopic display device. The liquid crystal slit grating according to the present invention can accurately control effect of spacers on light transmittance or accurately control crosstalk caused by spacers. The stereoscopic display device according to the present invention can improve three dimensional effect of the stereoscopic display device during three dimensionally displaying.

According to one aspect of the present invention, a liquid crystal slit grating is provided, which includes: a first grating substrate and a second grating substrate facing each other, and a plurality of photo spacers supporting between the first grating substrate and the second grating substrate.

Preferably, a first polarizer may be provided on a surface of the first grating substrate opposite to the second grating substrate, a second polarizer may be provided on a surface of the second grating substrate opposite to the first grating substrate, and directions of the first polarizer and the second polarizer are perpendicular or parallel to each other.

When the polarization directions of the first polarizer and the second polarizer are parallel to each other, the plurality of photo spacers may be provided in a transparent stripe area of the liquid crystal slit grating.

When the polarization directions of the first polarizer and the second polarizer are perpendicular to each other, the plurality of photo spacers may be provided in an opaque stripe area of the liquid crystal slit grating.

Preferably, nematic liquid crystal layer with twisted angle of 90 degree may be provided between the first grating substrate and the second grating substrate. The first grating substrate may include a first substrate, a first electrode and a first alignment layer are sequentially formed on a surface of the first substrate facing the second grating substrate, and the first polarizer may be provided on a surface of the first substrate opposite to the second grating substrate. The second grating substrate may include a second substrate, a second electrode and a second alignment layer are sequentially formed on a surface of the second substrate facing the first grating substrate, and the second polarizer may be provided on a surface of the second substrate opposite to the first grating substrate. The plurality of photo spacers may be provided between the first alignment layer and the second alignment layer.

According to an embodiment of the present invention, the second electrode may include a plurality of first stripe electrodes in parallel, the plurality of first stripe electrodes may be provided on the second substrate at intervals, and the second alignment layer may cover the first stripe electrodes and each interval area between the first stripe electrodes.

According to another embodiment of the present invention, the second electrode may include a plurality of first stripe electrodes and a plurality of second electrodes which are alternately provided and parallel to each other, and the second alignment layer may cover the first stripe electrodes and the second stripe electrodes.

In a case where the second electrode includes a plurality of first stripe electrodes in parallel, one portion of orthographic projection of every photo spacer on the second substrate may be located within orthographic projection of one of the plurality of first stripe electrodes on the second substrate, and the other portion of the orthographic projection of every photo spacer on the second substrate may be located within orthographic projection of the interval areas on the second substrate.

Preferably, half of the orthographic projection of every photo spacer on the second substrate may be located within the orthographic projection of one of the plurality of first stripe electrodes on the second substrate, and another half of the orthographic projection of every photo spacer on the second substrate may be located within the orthographic projection of the interval areas on the second substrate.

Alternatively, the orthographic projection of every photo spacer on the second substrate may be located within the orthographic projection of one of the plurality of first stripe electrodes on the second substrate In a case where the second electrode includes a plurality of first stripe electrodes and a plurality of second electrodes which are alternately provided and parallel to each other, one portion of orthographic projection of every photo spacer on the second substrate may be located within orthographic projection of one of the plurality of first stripe electrodes on the second substrate, and the other portion of the orthographic projection of every photo spacer on the second substrate may be located within orthographic projection of one of the plurality of second stripe electrodes on the second substrate.

Preferably, half of the orthographic projection of every photo spacer on the second substrate may be located within the orthographic projection of one of the plurality of first stripe electrodes on the second substrate, and another half of the orthographic projection of every photo spacer on the second substrate may be located within the orthographic projection of one of the plurality of second stripe electrodes on the second substrate.

Alternatively, the orthographic projection of every photo spacer on the second substrate may be located within the orthographic projection of one of the plurality of first stripe electrodes on the second substrate. Alternatively, the orthographic projection of every photo spacer on the second substrate may be located within the orthographic projection of one of the plurality of second stripe electrodes on the second substrate.

The photo spacers may be formed on the first alignment layer or on the second alignment layer.

According to another aspect of the present invention, a stereoscopic display device is provided, which includes a display panel and the liquid crystal slit grating according to the present invention, and the display panel and the liquid crystal slit grating are provided in parallel.

According to still another aspect of the present invention, a stereoscopic display device is provided, which includes a backlight, a liquid crystal display panel and the liquid crystal slit grating according to the present invention, and the liquid crystal slit grating and the liquid crystal display panel are provided in parallel.

The liquid crystal slit grating may be provided at a light emitting side of the liquid crystal display panel, and polarization direction of the second polarizer is the same as that of an upper polarizer of the liquid crystal display panel.

Alternatively, the liquid crystal slit grating may be provided between the liquid crystal display panel and the backlight, and polarization direction of the first polarizer is the same as that of a lower polarizer of the liquid crystal display panel.

Preferably, orthographic projection of every photo spacer on the display panel (or the liquid crystal display panel) is located within black matrix of the display panel (or the liquid crystal display panel).

The liquid crystal slit grating provided by the present invention may accurately control the position of every photo spacer by using photo spacers formed through mask, lithography process and the like, and thus can accurately control impact of spacers on light transmittance or accurately control crosstalk caused by spacers. The stereoscopic display device provided by the present invention including the liquid crystal slit grating according to the present invention, and accordingly can improve three dimensional effect of the stereoscopic display device during three dimensionally displaying.

REFERENCE NUMERALS OF THE MAIN COMPONENTS 100 display panel, 101 grating, 110 black matrix;
200 liquid crystal slit grating,
210 first substrate, 211 first electrode, 212 first alignment layer, 213 first polarizer,
220 second substrate, 221 second electrodes, 221' second stripe electrodes, 222 second alignment layer, 223 second polarizer,
230 nematic liquid crystal layer,
240 photo spacers.

DETAILED DESCRIPTION OF THE PREFERRED EMBODIMENTS

The embodiments of the present invention will be described clearly and completely in conjunction with the accompanying drawings illustrating the embodiments of the present invention below. However, the described embodiments are illustrative and not restrictive. Based on the teaching of the present invention, modifications and variations can be made to each embodiment by the person skilled in the art in detail and formality, and the present invention is intended to include all these modifications and variations.

Figure 4:
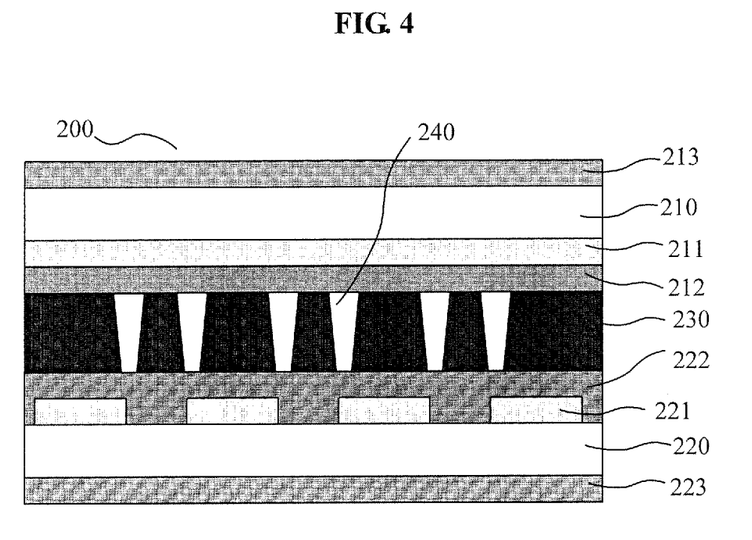
FIG. 4 is a schematic diagram of a liquid crystal slit grating according to an embodiment of the present invention.

FIG. 4 is a schematic diagram of liquid crystal slit grating 200 according to an embodiment of the present invention. As shown in FIG. 4, the liquid crystal slit grating 200 may include a first grating substrate and a second grating substrate facing each other, and further include a plurality of photo spacers 240 provided between the first grating substrate and the second grating substrate. Nematic liquid crystal layer 230 with twisted angle of 90 degree may be provided between the first grating substrate and the second grating substrate. The first grating substrate may include a first substrate 210, and a first electrode 211 and a first alignment layer 212 are sequentially provided on a surface of the first substrate 210 facing the second grating substrate. A first polarizer 213 may be provided on a surface of the first substrate 210 opposite to the second grating substrate. The second grating substrate may include a second substrate 220, and a second electrode 221 and a second alignment layer 222 are sequentially provided on a surface of the second substrate 220 facing the first grating substrate. A second polarizer 223 may be provided on a surface of the second substrate 220 opposite to the first grating substrate. The plurality of photo spacers 240 may be provided between the first alignment layer 212 and the second alignment layer 222.

The polarization directions of the first polarizer 213 and the second polarizer 223 may be parallel to each other, and in this situation, the plurality of photo spacers 240 may be provided in a transparent stripe area of the liquid crystal slit grating 200. Alternatively, the polarization directions of the first polarizer 213 and the second polarizer 223 may be perpendicular to each other, and in this situation, the plurality of photo spacers 240 may be provided in an opaque stripe area of the liquid crystal slit grating 200.

According to the embodiment shown in FIG. 4, the second electrode 221 includes a plurality of first stripe electrodes parallel to each other, the plurality of first stripe electrodes are provided on the second substrate 220 at intervals, and the second alignment layer 222 covers each first stripe electrode and each interval area between the first stripe electrodes. One portion of orthographic projection of every photo spacer 240 on the second substrate 220 is located within the orthographic projection of one of the plurality of first stripe electrodes on the second substrate 220, and the other portion of the orthographic projection of every photo spacer 240 on the second substrate 220 is located within the orthographic projection of the interval areas on the second substrate 220. Preferably, half of the orthographic projection of every photo spacer 240 on the second substrate 220 is located within the orthographic projection of one of the plurality of first stripe electrodes on the second substrate 220, and another half of the orthographic projection of every photo spacer 240 on the second substrate 220 is located within the orthographic projection of the interval areas on the second substrate 220.

In a case where the polarization directions of the first polarizer 213 and the second polarizer 223 are perpendicular to each other (i.e., the liquid crystal slit grating 200 is normally white mode), when there is operating potential difference existing between the first electrode 211 and the second electrode 221, this operating potential difference causes the nematic liquid crystal layer 230 located between each first stripe electrode of the second electrode 221 and the first electrode 211 not to twist the polarization direction of light by 90 degree any longer, thus the liquid crystal slit grating 200 displays black stripes at the position of each first stripe electrode, and white stripes which are transparent are formed between adjacent black stripes. A plurality of black stripes form opaque stripe area, and a plurality of white stripes form transparent stripe area. In this case, the photo spacers 240 are provided at junction areas of the opaque stripes and the transparent stripes.

On the other hand, in a case where the polarization directions of the first polarizer 213 and the second polarizer 223 are parallel to each other (i.e., the liquid crystal slit grating 200 is normally black mode), when there is operating potential difference existing between the first electrode 211 and the second electrode 221, this operating potential difference causes the nematic liquid crystal layer 230 located between each first stripe electrode of the second electrode 221 and the first electrode 211 not to twist the polarization direction of light by 90 degree any longer, thus the liquid crystal slit grating 200 displays white stripes at the position of each first stripe electrode, and opaque black stripes are formed between adjacent white stripes. A plurality of black stripes form opaque stripe area, and a plurality of white stripes form transparent stripe area. In this case, the photo spacers 240 are still provided at junction areas of the opaque stripes and the transparent stripes.

Therefore, according to the embodiment shown in FIG. 4, whether the polarization directions of the first polarizer 213 and the second polarizer 223 are perpendicular (i.e., normally white mode) or parallel (i.e., normally black mode) to each other, the orthographic projection of the photo spacers 240 in the transparent stripe area or the opaque strip area is only a part of the orthographic projection of the photo spacers 240 (preferably, is a half of the orthographic projection of the photo spacers 240). Therefore, for the liquid crystal slit grating 200 in normally white mode, the formation manner of the photo spacers 240 can effectively control the effect of the photo spacers 240 on light transmittance. On the other hand, for the liquid crystal slit grating 200 in normally black mode, the formation manner of the photo spacers 240 can preferably control the crosstalk caused by the photo spacers 240.

Particularly, the potential difference between each first stripe electrode of the second electrode 221 and the first electrode 211 may cause the display area corresponding to the edge of each first stripe electrode to generate certain crosstalk, and the display area corresponding to the edge of each photo spacer 240 may also generate certain crosstalk. According to the embodiment shown in FIG. 4, the crosstalk generated by the edges of the first stripe electrodes and the crosstalk generated by the edges of the photo spacers 240 may positionally overlap in part, and thus reducing the total area of the crosstalk generated by the edges of the first stripe electrodes and the crosstalk generated by the edges of the photo spacers 240.

Figure 5:
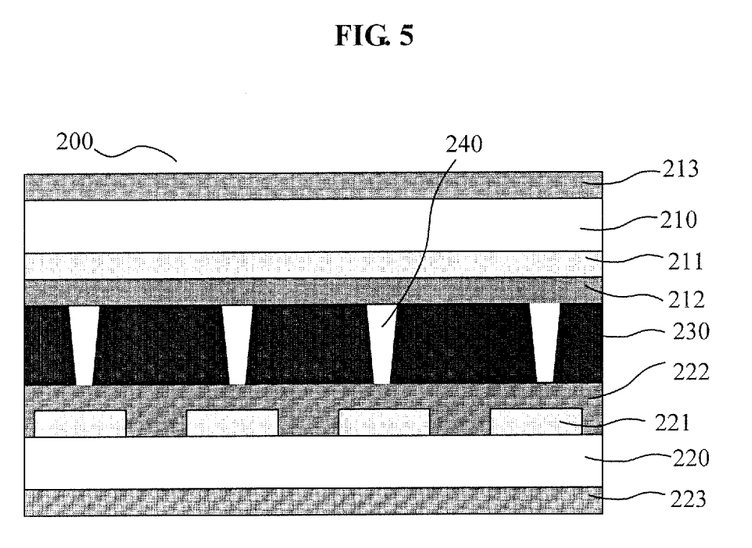
FIG. 5 is a schematic diagram of a liquid crystal slit grating according to another embodiment of the present invention.

FIG. 5 is a schematic diagram of a liquid crystal slit grating 200 according to another embodiment of the present invention. Compared to the embodiment shown in FIG. 4, the position where each photo spacer is formed is different. For purpose of clarity, below will focus on the difference from the embodiment shown in FIG. 4, and the same parts will be omitted.

As shown in FIG. 5, the orthographic projection of every photo spacer 240 on the second substrate 220 is located within the orthographic projection of one of the plurality of first stripe electrodes on the second substrate 220.

In a case where the polarization directions of the first polarizer 213 and the second polarizer 223 are perpendicular to each other (i.e., the liquid crystal slit grating 200 is normally white mode), when there is operating potential difference existing between the first electrode 211 and the second electrode 221, this operating potential difference causes the nematic liquid crystal layer 230 located between each first stripe electrode of the second electrode 221 and the first electrode 211 not to twist the polarization direction of light by 90 degree any longer, thus the liquid crystal slit grating 200 displays black stripes at the position of each first stripe electrode, and white stripes which are transparent are formed between adjacent black stripes. A plurality of black stripes form opaque stripe area, and a plurality of white stripes form transparent stripe area. In this case, the photo spacers 240 are provided in the opaque stripe area. For the liquid crystal slit grating 200 in normally white mode, the photo spacers 240 provided in the opaque stripe area will not affect light transmittance.

On the other hand, in a case where the polarization directions of the first polarizer 213 and the second polarizer 223 are parallel to each other (i.e., the liquid crystal slit grating 200 is normally black mode), when there is operating potential difference existing between the first electrode 211 and the second electrode 221, this operating potential difference causes the nematic liquid crystal layer 230 located between each first stripe electrode of the second electrode 221 and the first electrode 211 not to twist the polarization direction of light by 90 degree any longer, thus the liquid crystal slit grating 200 displays white stripes at the position of each first stripe electrode, and opaque black stripes are formed between adjacent white stripes. A plurality of black stripes form opaque stripe area, and a plurality of white stripes form transparent stripe area. In this case, the photo spacers 240 are provided in the transparent stripe area. For the liquid crystal slit grating 200 in normally black mode, the photo spacers 240 provided in the transparent stripe area will not generate crosstalk.

Figure 6:
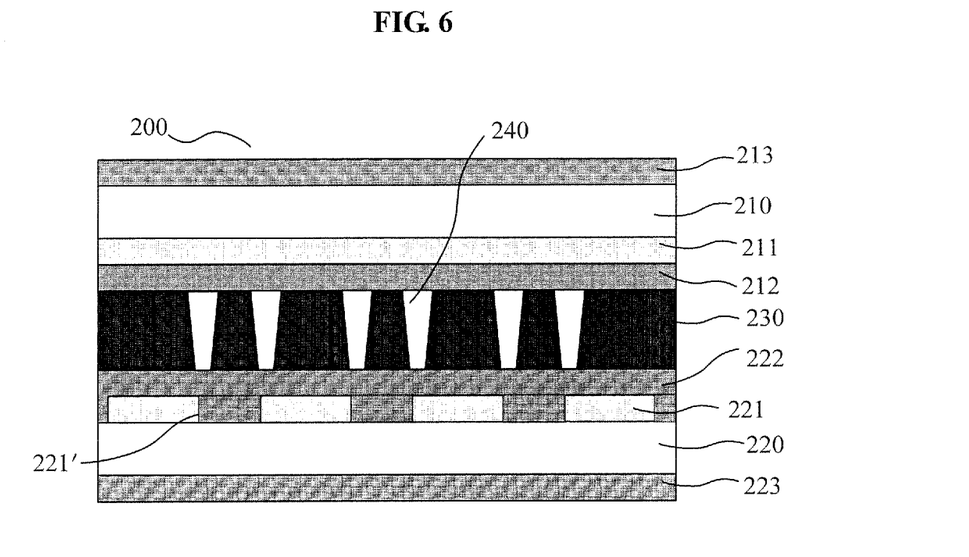
FIG. 6 is a schematic diagram of a liquid crystal slit grating according to another embodiment of the present invention.

FIG. 6 is a schematic diagram of a liquid crystal slit grating 200 according to still another embodiment of the present invention. Compared to the embodiment shown in FIG. 4, the second electrode 221 includes a plurality of first stripe electrodes and a plurality of second stripe electrodes 221' which are provided alternately and parallel to each other, and the second alignment layer 222 covers the first stripe electrodes and the second stripe electrodes 221'. For purpose of clarity, below will focus on the difference from the embodiment shown in FIG. 4, and the same parts will be omitted.

According to the embodiment shown in FIG. 6, one part of the orthographic projection of every photo spacer 240 on the second substrate 220 is located within the orthographic projection of one of the plurality of first stripe electrodes on the second substrate 220, and the other part of the orthographic projection of every photo spacer 240 on the second substrate 220 is located within the orthographic projection of one of the plurality of second stripe electrodes 221' on the second substrate 220. Preferably, a half of the orthographic projection of every photo spacer 240 on the second substrate 220 is located within the orthographic projection of one of the plurality of first stripe electrodes on the second substrate 220, and another half of the orthographic projection of every photo spacer 240 on the second substrate 220 is located within the orthographic projection of one of the plurality of second stripe electrodes 221' on the second substrate 220.

In a case where the polarization directions of the first polarizer 213 and the second polarizer 223 are perpendicular to each other (i.e., the liquid crystal slit grating 200 is normally white mode), when there is operating potential difference existing between the first electrode 211 and each first stripe electrode of the second electrode 221 whereas there is no operating potential difference existing between the first electrode 211 and each second stripe electrode 221' of the second electrode 221, the operating potential difference between the first electrode 211 and each first stripe electrode will cause the nematic liquid crystal layer 230 located between each first stripe electrode of the second electrode 221 and the first electrode 211 not to twist the polarization direction of light by 90 degree any longer, thus the liquid crystal slit grating 200 displays black stripes at the position of each first stripe electrode, and white stripes which are transparent are formed between adjacent black stripes. Alternatively, when there is operating potential difference existing between the first electrode 211 and each second stripe electrode 221' of the second electrode 221 whereas there is no operating potential difference existing between the first electrode 211 and each first stripe electrode of the second electrode 221, the operating potential difference between the first electrode 211 and each second stripe electrode 221' will cause the nematic liquid crystal layer 230 located between each second stripe electrode 221' of the second electrode 221 and the first electrode 211 not to twist the polarization direction of light by 90 degree any longer, thus the liquid crystal slit grating 200 displays black stripes at the position of each second stripe electrode 221', and white stripes which are transparent are formed between adjacent black stripes. In any event, a plurality of black stripes form opaque stripe area, and a plurality of white stripes form transparent stripe area. In this case, the photo spacers 240 are provided at the junction areas of the opaque stripes and the transparent stripes.

On the other hand, in a case where the polarization directions of the first polarizer 213 and the second polarizer 223 are parallel to each other (i.e., the liquid crystal slit grating 200 is normally black mode), when there is operating potential difference existing between the first electrode 211 and each first stripe electrode of the second electrode 221 whereas there is no operating potential difference existing between the first electrode 211 and each second stripe electrode 221' of the second electrode 221, the operating potential difference between the first electrode 211 and each first stripe electrode will cause the nematic liquid crystal layer 230 located between each first stripe electrode of the second electrode 221 and the first electrode 211 not to twist the polarization direction of light by 90 degree any longer, thus the liquid crystal slit grating 200 displays white stripes at the position of each first stripe electrode, and opaque black stripes are formed between adjacent white stripes. Alternatively, when there is operating potential difference existing between the first electrode 211 and each second stripe electrode 221' of the second electrode 221 whereas there is no operating potential difference existing between the first electrode 211 and each first stripe electrode of the second electrode 221, the operating potential difference between the first electrode 211 and each second stripe electrode 221' will cause the nematic liquid crystal layer 230 located between each second stripe electrode 221' of the second electrode 221 and the first electrode 211 not to twist the polarization direction of light by 90 degree any longer, thus the liquid crystal slit grating 200 displays white stripes at the position of each second stripe electrode 221', and opaque black stripes are formed between adjacent white stripes. In any event, a plurality of black stripes form opaque stripe area, and a plurality of white stripes form transparent stripe area. In this case, the photo spacers 240 are still provided at the junction areas of the opaque stripes and the transparent stripes.

Therefore, according to the embodiment shown in FIG. 6, whether the polarization directions of the first polarizer 213 and the second polarizer 223 are perpendicular (i.e., normally white mode) or parallel (i.e., normally black mode) to each other, and whether there are operating potential difference existing between the first electrode 211 and each first stripe electrode or between the first electrode 211 and each second stripe electrode 221', the orthographic projection of the photo spacers 240 in the transparent stripe area or the opaque strip area is only a part of the orthographic projection of the photo spacers 240 (preferably, is a half of the orthographic projection of the photo spacers 240). Therefore, for the liquid crystal slit grating 200 in normally white mode, the formation manner of the photo spacers 240 can effectively control the effect of the photo spacers 240 on light transmittance. On the other hand, for the liquid crystal slit grating 200 in normally black mode, the formation manner of the photo spacers 240 can preferably control the crosstalk caused by the photo spacers 240.

Particularly, the potential difference between each first stripe electrode (or second stripe electrode 221') of the second electrode 221 and the first electrode 211 may cause the display area corresponding to the edge of each first stripe electrode (or second stripe electrode 221') to generate certain crosstalk, and the display area corresponding to the edge of each photo spacer 240 may also generate certain crosstalk. According to the embodiment shown in FIG. 6, the crosstalk generated by the edges of the first stripe electrodes (or the second stripe electrodes 221') and the crosstalk generated by the edges of the photo spacers 240 may positionally overlap in part, and thus reducing the total area of the crosstalk generated by the edges of the first stripe electrodes (or the second stripe electrodes 221') and the crosstalk generated by the edges of the photo spacers 240.

Figure 7:
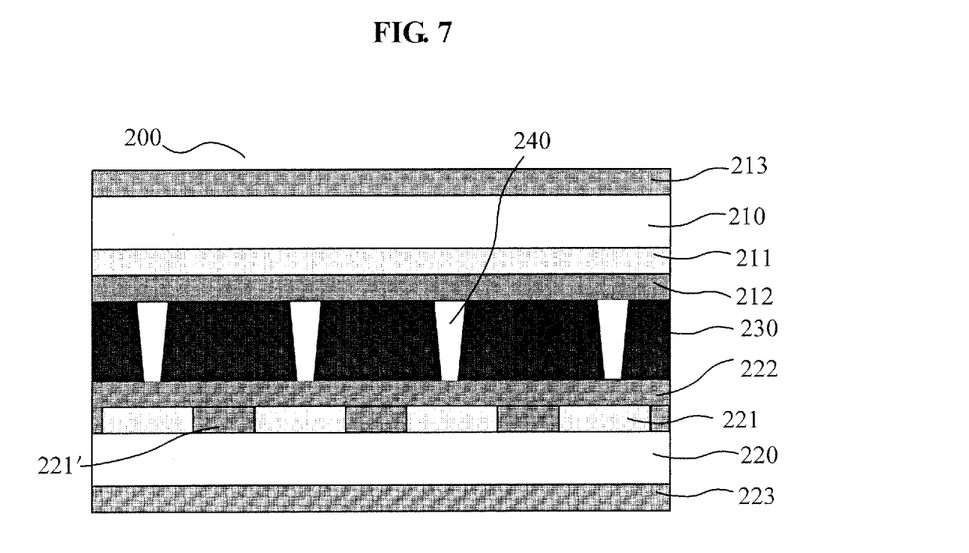
FIG. 7 is a schematic diagram of a liquid crystal slit grating according to another embodiment of the present invention.
Figure 8:
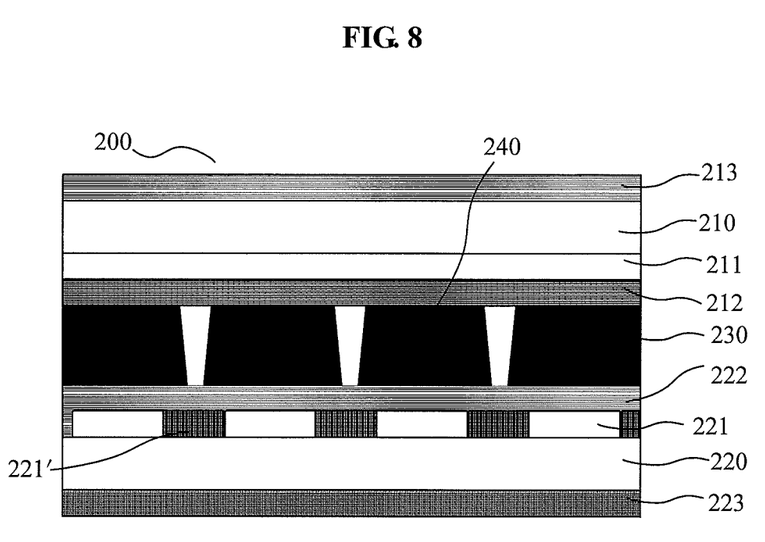
FIG. 8 is a schematic diagram of a liquid crystal slit grating according to another embodiment of the present invention.

FIGS. 7 and 8 are schematic diagrams of liquid crystal slit gratings 200 according to other embodiments of the present invention. Compared to the embodiment shown in FIG. 6, the position where each photo spacer is formed is different. For purpose of clarity, below will focus on the difference from the embodiment shown in FIG. 6, and the same parts will be omitted.

As shown in FIG. 7, the orthographic projection of every photo spacer 240 on the second substrate 220 is located within the orthographic projection of one of the plurality of first stripe electrodes on the second substrate 220.

Alternatively, as shown in FIG. 8, the orthographic projection of every photo spacer 240 on the second substrate 220 is located within the orthographic projection of one of the plurality of second stripe electrodes 221' on the second substrate 220.

In a case where there is operating potential difference existing between the first electrode 211 and each first stripe electrode of the second electrode 221 (the embodiment shown in FIG. 7) or in a case where there is operating potential difference existing between the first electrode 211 and each second stripe electrode 221' of the second electrode 221 (the embodiment shown in FIG. 8), respectively, the technical effects described according to FIG. 5 can be obtained, and the detailed description thereof is thus omitted herein.

The photo spacers 240 may be formed on the first alignment layer 212 or on the second alignment layer 222. Preferably, the photo spacers 240 may be formed on the second alignment layer 222, and thus avoiding effects on position accuracy of the photo spacers 240 caused by position errors when assembling the first substrate and the second substrate.

According to another aspect of the present invention, there is provided a stereoscopic display device, including a display panel and the liquid crystal slit grating according to the present invention, and the liquid crystal slit grating and the display panel are provided in parallel. The display panel may be any one of an electronic ink display panel of electronic book, a plasma display panel, a liquid crystal display panel and an organic light emitting diode display panel.

According to still another aspect of the present invention, there is provided a stereoscopic display device, including backlight, liquid crystal display panel and the liquid crystal slit grating according to the present invention, and the liquid crystal slit grating and the liquid crystal display panel are provided in parallel. The liquid crystal slit grating may be provided at a light emitting side of the liquid crystal display panel, and polarization direction of the second polarizer of the liquid crystal slit grating is the same as that of an upper polarizer on the liquid crystal display panel. Alternatively, the liquid crystal slit grating may be provided between the liquid crystal display panel and the backlight, and polarization direction of the first polarizer of the liquid crystal slit grating is the same as that of a lower polarizer on the liquid crystal display panel.

Figure 9:
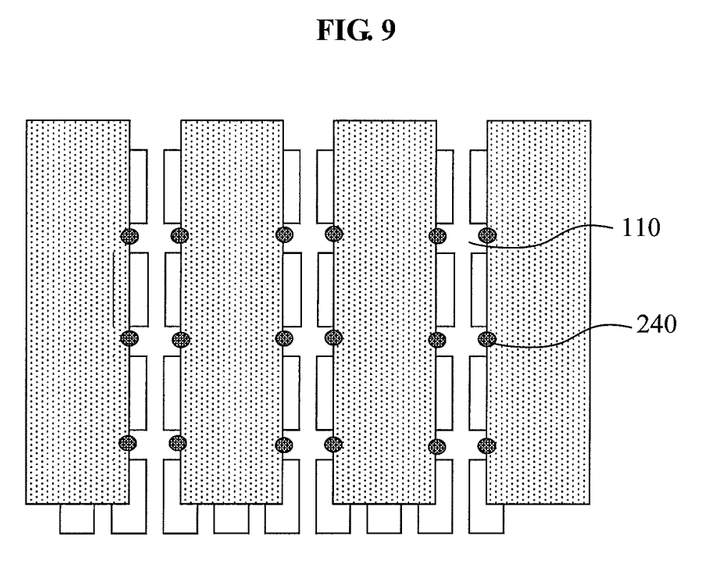
FIG. 9 is a schematic diagram of a stereoscopic display device according to an embodiment of the present invention.

FIG. 9 is a schematic diagram of a stereoscopic display device according to an embodiment of the present invention. As shown in FIG. 9, the orthographic projection of every photo spacer 240 of the liquid crystal slit grating on the display panel is located within black matrix 110 of the display panel.

Every photo spacer of the liquid crystal slit grating will cause disordered alignment of the surrounding liquid crystal thereof, and the black matrix of the display panel will block emitted light. When the orthographic projection of every photo spacer of the liquid crystal slit grating on the display panel is located within the black matrix of the display panel, there is no light around the photo spacers of the liquid crystal slit grating, and thus reducing crosstalk caused by disordered alignment of the liquid crystal surrounding the photo spacers.

Although each embodiment of the present invention has been described in detail with reference to the drawings, the person skilled in the art should understand that various modifications and variations can be made to each embodiment of the present invention in detail and formality without departing from the scope and spirit of the present invention, and the present invention is intend to include all these modifications and variations.

The invention claimed is:

1. A liquid crystal slit grating, including:
a first grating substrate and a second grating substrate facing each other;
a nematic liquid crystal layer with twisted angle of 90 degree provided between the first grating substrate and the second grating substrate; and
a plurality of photo spacers provided between the first grating substrate and the second grating substrate, and the photo spacers being isotropic,
wherein a first polarizer is provided on a surface of the first grating substrate opposite to the second grating substrate, a second polarizer is provided on a surface of the second grating substrate opposite to the first grating substrate, and polarization directions of the first polarizer and the second polarizer are parallel to each other, and
wherein the first grating substrate includes a first substrate, a first electrode and a first alignment layer that are sequentially formed on a surface of the first substrate facing the second grating substrate, and the first polarizer is provided on a surface of the first substrate opposite to the second grating substrate,
wherein the second grating substrate includes a second substrate, a second electrode and a second alignment layer that are sequentially formed on a surface of the second substrate facing the first grating substrate, and the second polarizer is provided on a surface of the second substrate opposite to the first grating substrate, and
wherein the second electrode includes a plurality of first stripe electrodes in parallel, the plurality of first stripe electrodes are provided on the second substrate at intervals, there are no other electrodes provided in the interval areas between the first stripe electrodes, and the second alignment layer covers the first stripe electrodes and each interval area between the first stripe electrodes,
wherein when operating potential difference exists between the first electrode and the second electrode, transparent stripe areas are formed at the position of each of the first stripe electrodes of the second electrode, and opaque stripe areas are formed between adjacent transparent stripe areas,
wherein the plurality of photo spacers are only provided at positions corresponding to the first stripe electrodes and do not overlap with the interval areas between the first stripe electrodes.

2. The liquid crystal slit grating according to claim 1, wherein,
the plurality of photo spacers are provided between the first alignment layer and the second alignment layer.

3. The liquid crystal slit grating according to claim 2, wherein, the photo spacers are formed on the first alignment layer or on the second alignment layer.

4. A stereoscopic display device, including a display panel and the liquid crystal slit grating according to claim 1, wherein the display panel and the liquid crystal slit grating are provided in parallel.

5. The stereoscopic display device according to claim 4, wherein, an orthographic projection of every photo spacer of the liquid crystal slit grating on the display panel is located within a black matrix of the display panel.

6. A stereoscopic display device, including
a backlight;
a liquid crystal display panel; and
a liquid crystal slit grating defined by claim 1, wherein, the liquid crystal slit grating and the liquid crystal display panel are provided in parallel.

7. The stereoscopic display device according to claim 6, wherein, the liquid crystal slit grating is provided at a light emitting side of the liquid crystal display panel, and the polarization direction of the second polarizer of the liquid crystal slit grating is the same as that of an upper polarizer of the liquid crystal display panel, or wherein, the liquid crystal slit grating is provided between the liquid crystal display panel and the backlight, and the polarization direction of the first polarizer of the liquid crystal slit grating is the same as that of a lower polarizer of the liquid crystal display panel.

8. The stereoscopic display device according to claim 7, wherein, an orthographic projection of every photo spacer on the liquid crystal display panel is located within a black matrix of the liquid crystal display panel.

9. The stereoscopic display device according to claim 6, wherein, an orthographic projection of every photo spacer on the liquid crystal display panel is located within a black matrix of the liquid crystal display panel.

* * * * *